United States Patent Office 3,448,773
Patented June 10, 1969

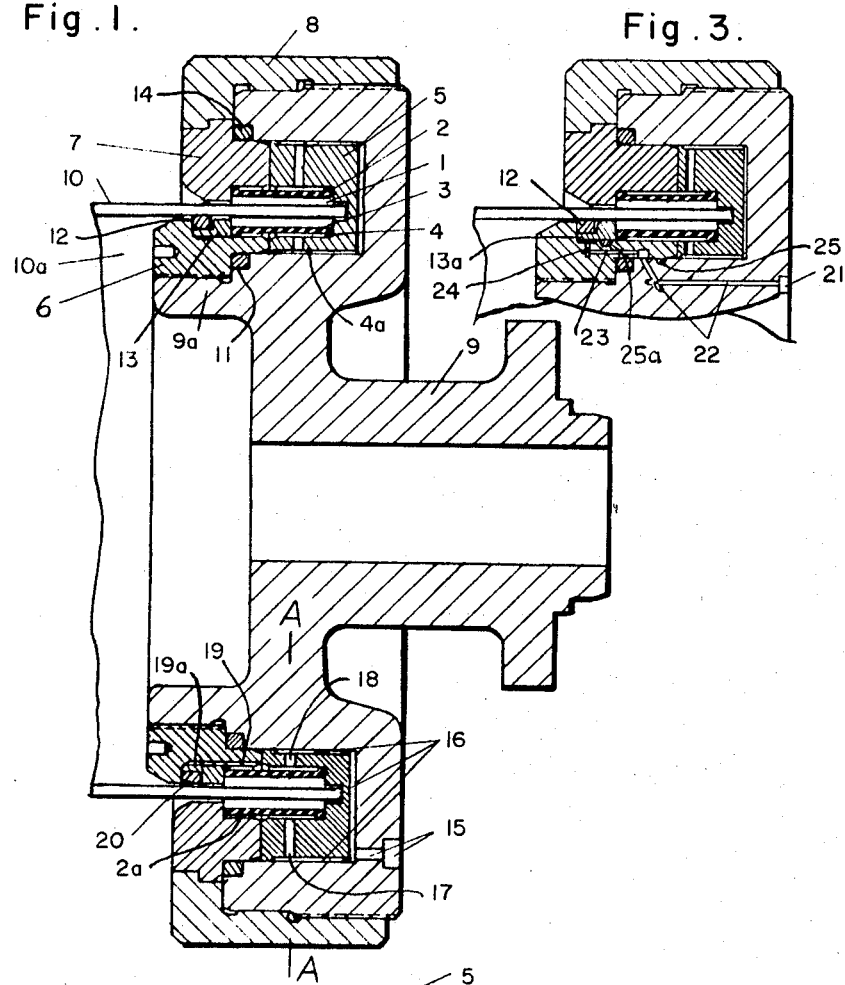
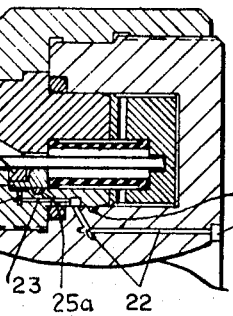
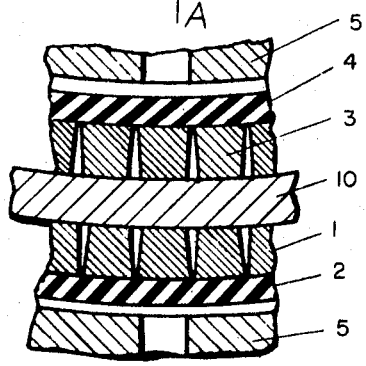

3,448,773
SEALING AND CLAMPING HEADS
Ali Bindernagel, Dusseldorf-Gerresheim, Erwin Kost, Osterath, Germany, and Rolf Steinbock, Carnegie, Pa., assignors to Kommanditgesellschaft Friedrich Kocks, Dusseldorf, Germany, a corporation of Germany
Filed Mar. 24, 1967, Ser. No. 625,730
Claims priority, application Germany, Mar. 26, 1966,
K 58,836
Int. Cl. F16l 55/12, 17/06
U.S. Cl. 138—90                    2 Claims

ABSTRACT OF THE DISCLOSURE

A sealing and clamping head for pressure testing of tubes and the like hollow bodies having a multipart housing receiving at one end the open end of the tube to be tested and means for supplying pressure from the other side. A ring sealingly engages the end of the hollow body against the housing and actuated along with a clamping segment by said pressure, said clamping segment including a sealing collar with enclosed clamping segments movable radially in unison and a second clamping means on the other side of the wall of the hollow body actuated by said pressure means in a direction opposing said first clamping means.

---

This invention relates to sealing and clamping heads and particularly to devices for testing tubes and hollow bodies similar to tubes by pressure-testing with the aid of a fluid fed to them under high pressure. More particularly, the invention relates to sealing- and clamping heads which are put on an open end of the hollow body to be tested and otherwise tightly closed off so as to shut it tightly against the testing pressure as well as being held on it against this pressure. The pressure fluid is then fed through the head to the hollow body to be tested. Known sealing- and clamping heads of this type comprise a multipart housing in which can be introduced from one side an open end of the hollow body and from the other side the pressure means, and in which are provided a ring sealing the introduced end of the hollow body against the housing as well as a clamping means radially adjustable against the circumference of the hollow body; both can be actuated by a pressure means.

Sealing- and clamping heads heretofore disclosed by applicants are provided with a clamping means comprising a sealing collar of high-resilient material—e.g. rubber—direct exposed to the pressure means and a one-piece or multipiece clamping part enclosed by this collar and made of a material, e.g., metal, stronger than the collar material. This clamping part participates in the radial motions of the sealing collar. For instance, this clamping part comprises a sleeve provided with overlapping slots starting alternately from its two ends or a larger quantity of bars arranged each next to the other within slight distances and having a rectangular cross section or a trapezoid cross section decreasing to the inside. These bars are fixed with one longitudinal side at the inside of the collar or are kept in constant contact with this area by means of springs.

If the pressure testing means is used—as it is often common practice—as pressure means for the clamping means, the clamping means must be of great length as compared to the tube diameter for transferring the necessary holding power. Since the part of the tube end introduced in the clamping- and sealing head is, during pressure-testing, exposed to the testing pressure in a manner different from the remaining tube parts, these ends must be cut off in many instances as not having been tested. They cause therefore substantial losses of tubing by failure to test such ends. The clamping means and consequently the lost end could be shortened, when a pressure means pressure for the clamping means would be used, which is higher than that of the testing means pressure. In this case, however, the danger arises, above all when tubes of large diameter are concerned, that the tube ends are permanently deformed and buckle, the latter especially in case of tubes, the wall thickness of which is thin as compared with the tube diameter. Moreover, the production of a higher pressure necessitates additional pressure producing facilities and control parts resulting in an increase of the prime costs as well as the costs for operation and maintenance.

For providing the necessary holding power in a sealing- and clamping head of the above-mentioned type enabling a minimum length of the clamping means and the least losses of non-tested parts, this invention provides preferably a second clamping means at a sealing- and clamping head of the above-mentioned type, which is arranged on the other side of the wall of the hollow body opposite to the clamping means enclosing the hollow body and which can be actuated by the pressure means pressure. In case of such an arrangement of two clamping means and using the testing means as pressure means, the length of the clamping means may be only half as long as the length of the clamping means to be adjusted at one side to the wall of the hollow body.

The inventive arrangement at both sides of a clamping means offers in addition to advantage that the testing means pressure can be selected in case of need to be of almost any desired level for increasing the clamping power irrespective of the thickness of the tube wall and eliminating any risk of exceeding the yield point or denting at the tube.

The application of clamping means comprising bar-shaped clamping parts entails the further advantage that the clamping head can be designed not only for tubes of a certain diameter and a certain wall thickness, but also for tubes of different wall thickness and as well even for the next lager and/or next inferior diameter.

The foregoing general description of this invention has set out certain objects, purposes and advantages to be derived from its practice. Other objects, purposes and advantages will be apparent from a consideration of the following description and the accompanying drawings in which:

FIGURE 1 shows a longitudinal section through the sealing- and clamping head comprising clamping means arranged one each on the outside and inside tube surface area;

FIGURE 2 shows in enlarged scale a section along the line A—A of the sealing- and clamping head as per FIGURE 1;

FIGURE 3 shows a partial longitudinal section of a sealing- and clamping head comprising a separate pressure means feed for the sealing ring and the sealing collars.

In the embodiments shown in the FIGURES 1, 2, and 3, the clamping parts 1 and 3 arranged at the area directed to the work piece 10 of the sealing collars 2 and 4 consist, as already suggested, of individual bars. They are arranged in opposite position as well as directly opposite to the outer- and inner sides of the tube 10. The clamping parts 1 and 2 and the sealing collars 3 and 4 making up an inner clamping means (1 and 2) and an outer clamping means (3 and 4) are held in the sealing- and clamping housing 9 between an interchangeable ring 5 and an outer pressure ring 7 as well as inner pressure ring 6, both of which can be adjusted to the holding ring 5. The holding ring 5 is provided—distributed over its free outer areas—with radial and axial pressure means channels 16 as well as radial bores 17 and 18 which run into the hollow spaces 2a and 4a through the free circumferential areas of the sealing collars 2 and 4. A line connection 15 is provided for feeding pressure means.

The outer pressure ring 7 provided with a recess for the outer clamping means 1, 2 can be pressed against the holding ring 5 with the aid of a ring nut 8, which can be screwed on the outside of the sealing- and clamping head housing 9. The inner pressure ring 6 screwed on a centrical pin accommodates with the aid of a recess inside of the inner clamping means 3, 4 a sealing ring 12 with holding ring 13.

The feed of pressure means to the hollow space 20 through the sealing ring 12 can be effected either from the hollow space 4a through channels 19 distributed over the outer circumference of the pressure ring 6 and radial bores 19a in the holding ring 13 or if another pressure means pressure shall be exerted to the seal 12 as on the sealing collars 2 and 4 through special feeding lines 21, 22, 23, 24 and 13a (FIGURE 3).

For sealing the ring 7 and the ring 6 against the housing 9, the sealing rings 11 and 14 are provided. In case of the arrangement as per FIGURE 3, there are provided in addition another sealing ring 25a between the clamping ring 13a and the ring 6 and another sealing ring 25 between the ring 6 and the housing 9.

The arrangement shown in FIGURE 3 is preferably used if—which is expedient in many cases—the pressure means pressure for the sealing ring is different from that for the clamping means or if sealing ring and clamping means shall not be loaded simultaneously such as, for example where it could be necessary to clamp at first and to seal subsequently or vice versa.

The invention is also suited for facilities which are only used as clamping heads without need for sealing. In this case, the sealing ring 12 along with the clamping ring 13 as shown in FIGURE 1 are not necessary.

The description hereinabove and the drawings hereto attached illustrate and describe certain preferred practices and embodiments of this invention. It will be understood however, that this invention may be practiced and embodied in various other modifications within the scope of the following claims.

We claim:

1. A sealing and clamping head for closing and holding one end of a tube or like hollow body to be pressure tested comprising a multipart housing receiving at one end the open end of the hollow body to be tested and a means for supplying pressure from the other side, a ring sealingly engaging the end of the hollow body against the housing, a first clamping means adjustable to the circumference of the hollow body, said sealing ring and clamp means being actuated by the pressure means, said clamping means including a sealing collar directly exposed to the pressure from the pressure means and a clamping segment enclosed by said collar and moving radially with said collar and a second clamping means on the other side of the wall of said hollow body actuated by said pressure means in a direction opposing said first clamping means.

2. A sealing and clamping head as claimed in claim 1 wherein the clamping means are actuated by a pressure different from the sealing ring.

References Cited

UNITED STATES PATENTS

| 922,544 | 5/1909 | Turner et al. | 138—90 |
| 1,757,724 | 5/1930 | Larson | 138—90 |
| 2,655,182 | 10/1953 | Hayes et al. | 138—90 |
| 2,873,764 | 2/1959 | Lombard et al. | 138—90 |

OTHER REFERENCES

German printed application 1,053,890 (1959).
German printed application 1,094,059 (1960).

HOUSTON S. BELL, JR., *Primary Examiner.*

U.S. Cl. X.R.

138—93; 277—71; 285—96